US010673574B2

(12) United States Patent
Christoffersson et al.

(10) Patent No.: US 10,673,574 B2
(45) Date of Patent: Jun. 2, 2020

(54) METHODS AND APPARATUSES FOR GROUP TRANSMISSIONS

(71) Applicant: Telefonaktiebolaget LM Ericsson (publ), Stockholm (SE)

(72) Inventors: Jan Christoffersson, Luleå (SE); Mårten Ericson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/312,615

(22) PCT Filed: Jun. 22, 2016

(86) PCT No.: PCT/SE2016/050615
§ 371 (c)(1),
(2) Date: Dec. 21, 2018

(87) PCT Pub. No.: WO2017/222433
PCT Pub. Date: Dec. 28, 2017

(65) Prior Publication Data
US 2019/0312684 A1     Oct. 10, 2019

(51) Int. Cl.
*H04W 72/04* (2009.01)
*H04L 1/18* (2006.01)
(Continued)

(52) U.S. Cl.
CPC .......... *H04L 1/1812* (2013.01); *H04L 1/1692* (2013.01); *H04L 1/1896* (2013.01);
(Continued)

(58) Field of Classification Search
CPC ..... H04L 1/1812; H04L 1/1896; H04L 43/16; H04L 1/1692; H04L 2001/0093;
(Continued)

(56) References Cited

U.S. PATENT DOCUMENTS

| 2009/0323577 A1* | 12/2009 | Agrawal | ............... H04L 1/0026 |
| | | | 370/312 |
| 2010/0058133 A1* | 3/2010 | Lee | ............... H04B 7/2606 |
| | | | 714/748 |
| 2016/0345326 A1* | 11/2016 | Yerramalli | ........ H04W 72/0453 |

FOREIGN PATENT DOCUMENTS

| WO | 2009158545 A2 | 12/2009 |
| WO | 2010028061 A2 | 3/2010 |

OTHER PUBLICATIONS

Ericsson, "R1-162831: Uu Enhancements for V2X," Third Generation Partnership Project (3GPP), TSG RAN WG1 Meeting #84bis, Apr. 11-15, 2016, 3 pages, Busan.

(Continued)

*Primary Examiner* — Lakeram Jangbahadur
(74) *Attorney, Agent, or Firm* — Sage Patent Group

(57) ABSTRACT

The embodiments herein relates to a network node, a UE, and methods thereof for reliable group transmissions. The method in the UE comprises receiving, from a network node, at least one signaling comprising HARQ parameters including a diversity distance between a HARQ transmission and a subsequent HARQ re-transmission and information on a number of retransmissions; receiving at least one transmission comprising at least one packet from the network node; decoding the received at least one packet; if the decoding of the at least one packet is successful, encoding the at least one packet and retransmitting, to at least one other UE of the group, the at least one transmission including the at least one encoded packet, wherein retransmitting of the at least one packet is performed simultaneously as retransmission of the at least one transmission from the network node to the at least one other UE of the group.

12 Claims, 15 Drawing Sheets

(51) Int. Cl.
  *H04L 1/16* (2006.01)
  *H04L 12/26* (2006.01)
  *H04L 1/00* (2006.01)

(52) U.S. Cl.
  CPC ......... *H04L 43/16* (2013.01); *H04W 72/0446* (2013.01); *H04L 1/1887* (2013.01); *H04L 2001/0093* (2013.01); *H04L 2001/0097* (2013.01)

(58) Field of Classification Search
  CPC ........... H04L 2001/0097; H04L 1/1887; H04L 1/1825; H04W 72/0446
  See application file for complete search history.

(56) References Cited

OTHER PUBLICATIONS

Ericsson, "R2-162815: Other MBMS Enhancements for V2X," Third Generation Partnership Project (3GPP), TSG-RAN WG2 #93-bis, Apr. 11-15, 2016, 2 pages, Dubrovnik, Croatia.

Nortel, "R1-083866: More Design Aspects on Downlink Transparent Relay in LTE-A," Third Generation Partnership Project (3GPP), TSG-RAN1 Meeting #54bis, Sep. 29-Oct. 3, 2008, 5 pages, Prague, Czech.

International Search Report and Written Opinion for International Patent Application No. PCT/SE2016/050615, dated Apr. 4, 2017, 20 pages.

* cited by examiner

METHODS AND APPARATUSES FOR GROUP TRANSMISSIONS

This application is a 35 U.S.C. § 371 national phase filing of International Application No. PCT/SE2016/050615, filed Jun. 22, 2016, the disclosure of which is incorporated herein by reference in its entirety.

TECHNICAL FIELD

The present disclosure relates to the field of wireless communications, and in particular to a method performed by a network node; a network node; a method performed by a user equipment and a user equipment for group transmissions.

BACKGROUND

Device-to-Device (D2D) or sidelink communications and cellular- or network-controlled D2D (sidelink) communications are expected to play an important role in the next generation wireless networks D2D technology can be used to provide diversity in space, time and frequency, and increase the robustness against fading and interference. User Equipment (UE) cooperation based on D2D is a technology that is receiving attention. With advances in D2D communications, UE cooperation is expected to play an important role in the future of wireless communication systems such as Long Term Evolution (LTE), also known as the fourth Generation (4G); enhanced LTE, (eLTE) advanced or fifth Generation (5G) and so on. Hereinafter by D2D communications is also meant sidelink communications.

One object with group transmission using D2D ("cooperative D2D") may be a way to increase the coverage and user bit rate for example in the future high frequency 5G network. As mentioned, UE cooperation based on D2D, or, in other words, cooperative D2D, is gaining traction in the industry. A concept how group transmission using D2D can be performed was developed recently. According to the concept, the respective UEs in the group of UEs transmit synchronized as one antenna array in order to increase the UpLink (UL) coverage and bit rate. The UEs first transmit the data within the group using D2D methods and then transmit the same data jointly to the network node.

With group transmission, the basic idea is that the network node or base station sees the group as one single UE. All UEs have the data in their group transmission Hybrid Automatic Repeat ReQuest (HARQ) buffers and their transmissions completely synchronized. Since the UL transmissions rely on HARQ feedback, in the form of an ACKnowledgment (ACK) or Non-ACK (NACK), reception of the feedback need to be done by all UEs and also interpreted the same way by all UEs.

The HARQ protocol is widely used in 3G and 4G systems and will undoubtedly be used also in 5G systems to provide fast re-transmissions on the Medium Access Control (MAC) layer. As explained above, HARQ is used both in the UL and in the DL and may be configured in different ways, e.g. the maximum number of re-transmissions, operating BLock Error Rate (BLER), when and how to retransmit etc. Compared to the unicast transmission scheme, group transmission (multicast within a group) is more efficient in terms of the resource consumption. There are a few ways to do group transmission. One option is to do group transmission using D2D as explained earlier, the D2D interface is referred to PC5 interface in LTE. Another other option is to use Multimedia Broadcast Muti Multicast Service (MBMS) techniques. It is a network (NW) entity or a network node, e.g., a base station that does the group transmission using the cellular air interface, i.e., Uu. In order to do group transmission, support of the user feedback and HARQ with retransmission functionality is important for the transmitter to achieve reliable and efficient group transmission. It is under discussion in 3GPP to introduce both features in group transmission techniques, like Vehicle to Vehicle (V2X e.g. Vehicle to Vehicle (V2V)) Work Item (WI) in 3GPP (see references Ericsson R1-162831 entitled "Uu Enhancements for V2X" and Ericsson R2-162815 entitled "Other MBMS Enhancements for V2X").

As described above, a special situation where the HARQ protocol could be applied is a Single Cell Point To Multipoint (SC-PTM) transmission in V2X communication. This is assumed to be a complementary bearer type for MBMS transmission (in addition to MBSFN transmission), i.e. the Release-12 MBMS architecture is used. The SC-PTM transmission may be seen as transferring a MBMS session using the Physical Downlink Shared Channel (PDSCH). For each MBMS session, it is normally only one scheduling entity per cell due to there is usually one group of users (UEs) defined for one MBMS session/service. The group receives the MBMS data from BM-SC, then forwards/distributes data in the cell via PDSCH in the allocated sub-frames, which may be predefined. This scheduling entity behaves like a normal single UE scheduling entity concerning the scheduling and transmission procedure. The SC-PTM, or MBMS (MBSFN) are the candidate multicast/broadcast transmission techniques for V2X when LTE cellular link based delivery option is chosen.

A way to implement the HARQ protocol is to use autonomous re-transmissions, i.e. the transmitter always performs a given number of HARQ retransmission attempts. Autonomous retransmissions are especially suitable in one-to-many communication scenarios since using HARQ feedback from many recipients is complicated. With suitable setting for the number of HARQ transmission attempts, most of transmission errors can be recovered. FIG. 1 depicts autonomous re-transmissions.

IN FIG. 1, n is the Transmission Time Interval (TTI) number. The Figure also visualizes a NetWork node (NW); UE1; UE2 and UEN. The NW node is configured to execute a given number of re-transmissions regardless whether or not the group of UEs succeeds in receiving the re-transmissions. A re-transmission (by the NW node) occurs immediately after the first transmission as shown; UEs close to the NW node are able to successfully decode the receive message included in the re-transmission. In FIG. 1, UE1 has succeeded the decoding (OK for each transmission and re-transmission). Bu UEs at cell-edge (here UE2 an d UEN) may not always be able to decode the message even with a re-transmission message. This is shown with FALSE for UE2 and UEN.

The FIGS. 2-4 depict a V2X simulation using single cell point to multipoint (SCPTM) to transmit a Cooperative Awareness Message (CAM). CAM is one of the components of the reference architecture defined by the European Telecommunication Standards Institute (ETSI) for transmitting geographically aware information with relevant date for other vehicles. The simulation is for an LTE network with 10 MHz bandwidth. FIG. 2 shows the transmission reliability of the CAM without using HARQ operations to support link adaptation and retransmissions according to the radio channel quality.

For example, in FIG. 2, there are a few percent of the users with a SINR below 0 dB, which cannot ensure transmission reliability with only 1 transmission attempt.

Since it is challenging to guarantee all vehicles in the area (cells) with SCPTM like transmission schemes transmission reliability, it is natural to introduce the support of HARQ functionalities which support retransmissions. However, using retransmissions to achieve reliable transmission introduces additional delays.

A problem with autonomous re-transmissions is that some resources are wasted due to unnecessary re-transmissions where the group transmission has already succeeded in the first transmission attempt. Also, it is generally difficult to find a suitable setting due to the UEs in the group might have very different radio link status and different mobility status. The conditions may also change dynamically. FIG. 3 shows how the successful reception rate increases with the number of configured retransmissions in a V2X scenario. The drawback of configuring a high number of autonomous retransmissions is shown in FIG. 4 which depicts the end-to-end delay for different number of configured re-transmissions. It is clear that there is a trade-off between successful reception ratio and end-to-end delay.

In 5G-based NX Radio Access Technology (RAT) employing higher frequencies, the challenging propagation conditions at higher frequencies essentially Line-Of-Site (LOS) to the network node e.g. an eNode B or a base station is needed for good radio conditions. This suggests that which UEs in a group that will have good radio conditions will change more rapidly over time compared to that in LTE. It also implies that autonomous retransmissions in the NX RAT will require a high number of re-transmissions.

Utilizing D2D within the group can be exploited to increase the performance of autonomous retransmissions as previously described. In the NX RAT scenario this could be especially fruitful since there will be users with LOS between one another and where one UE have LOS to NW node and another UE which does not have LOS to the NW node. Hence, one UE will have a good channel to the NW node and to a UE which has a bad channel to the NW node. FIG. 5 illustrates the situation where UEs have LOS to each other but not all have LOS to the NW node.

Furthermore, the scenario with autonomous retransmissions is a situation, perhaps the only, where a majority of the UEs know exactly what will be retransmitted.

The current group transmission technique is not sufficient to deliver V2X messages efficiently and it is meaningful to investigate how to improve the autonomous group HARQ transmission schemes by combining the eNode Bs (NW nodes) retransmissions with D2D (sidelink) transmissions between the UEs.

SUMMARY

It is an object of embodiments herein to solve the above problems by providing a method performed by a network node; a network node; a method performed by a UE and a UE for group transmission. Advantages are e.g. increase in SINR or SNR and improving group transmissions.

According to an aspect of embodiments herein, there is provided a method performed by network node for group transmission, the group comprising multiple UEs the method comprising: performing HARQ transmission to said UEs of the group; receiving HARQ feedback from at least one UE of the group, in response to the HARQ transmission; determining a quality of each received HARQ feedback; and when said determined quality is below a predefined first quality threshold; increasing a number of HARQ re-transmissions to said at least one UE and/or increasing a diversity distance i.e. increasing the number of TTIs, between said HARQ transmission and a subsequent HARQ re-transmission.

According to an embodiment, the method further comprising transmitting to at least one UE of the group at least one signaling comprising HARQ, parameters including said diversity distance and information on a number of retransmissions.

According to another aspect of embodiments herein, there is provided a method performed by a UE, for group transmission, the group comprising multiple UEs, the method comprising: receiving from a network node, at least one signaling comprising HARQ parameters including a diversity distance i.e. a number of TTIs, between a HARQ transmission and a subsequent HARQ re-transmission and information on a number of retransmissions; receiving at least one transmission comprising at least one packet from the network node; decoding the received at least one packet; if the decoding of the at least one packet is successful; encoding the at least one packet and retransmitting, to at least one other UE of the group, the at least one transmission including the at least one encoded packet, wherein retransmitting of the at least one packet is performed simultaneously as retransmission of the at least one transmission from the network node to the at least one other UE of the group.

According to another aspect of embodiments herein, there is provided a network node for group transmission, the group comprising multiple UEs the network node comprising a processor and a memory; said memory containing instructions executable by the processor whereby the network node is operative to: perform HARQ transmission to said UEs of the group; receive HARQ feedback from at least one UE of the group, in response to the HARQ transmission; determine a quality of each received HARQ feedback; and when said determined quality is below a predefined first quality threshold; increase a number of HARQ retransmissions to said at least one UE and/or increase a diversity distance i.e. increasing the number of Transmission Time Intervals, TTIs, between said HARQ transmission and a subsequent HARQ re-transmission.

According to an embodiment, the network node is further operative to to transmit to at least one UE of the group at least one signaling comprising HARQ, parameters including said diversity distance and information on a number of retransmissions.

According to another aspect of embodiments herein, there is provided a UE for group transmission, the group comprising multiple UEs comprising a processor and a memory; said memory containing instructions executable by the processor whereby the UE is operative to: receive from a network node, at least one signaling comprising HARQ parameters including a diversity distance i.e. a number of TTIs, between a HARQ transmission and a subsequent HARQ re-transmission and information on a number of retransmissions; receive at least one transmission comprising at least one packet from the network node; decode the received at least one packet; and if the decoding of the at least one packet is successful; encode the at least one packet and retransmit, to at least one other UE of the group, the at least one transmission including the at least one encoded packet, wherein retransmitting of the at least one packet is performed simultaneously as retransmission of the at least one transmission from the network node to the at least one other UE of the group

BRIEF DESCRIPTION OF THE DRAWINGS

Examples of embodiments herein are described in more detail with reference to attached drawings in which.

DETAILED DESCRIPTION

In the following, a detailed description of the exemplary embodiments is described in conjunction with the drawings, in several scenarios to enable easier understanding of the solution(s) described herein.

According to some embodiments herein controlling the success rate of the group transmissions is performed by tuning the number of retransmissions and diversity difference to achieve the desired success rate as measured by e.g. the HARQ NACK or CQI (Channel Quality Information) reports from the UEs.

The success rate of the transmissions is governed by the number of re-transmission attempts and the diversity distance, i.e. the number of TTIs between the original transmission and the subsequent re-transmission(s). Increasing either of these will increase the success rate. However, this inevitably introduces additional delay. The setting is chosen considering the tradeoff between desired success rate and maximum allowed transmission delay. Tuning which parameter first depends on the situation (channel conditions, UE speeds, and the system load). In case the system or network served by a network node is lowly loaded, or cellular connections in the group are rather stable, one may first tune the number of retransmission attempts, then tune the diversity distance. Otherwise, the network node may first tune the diversity distance, then update the setting of number of retransmission attempts. It is further proposed to detect UEs that have consistently bad success rate and exclude them from the group. Increased diversity can also be obtained by changing Physical Resource Block (PRB) regions between the original transmission and the retransmission(s).

As disclosed above, exemplary embodiments herein propose a way to control the success rate of the group transmissions by tuning the number of re-transmissions and diversity difference to achieve the desired success rate as measured by e.g. the user feedback HARQ NACK or CQI reports.

A subset of the UEs/vehicles maybe selected for reporting channel quality measurement(s), acknowledgement of ongoing transmissions, and statistics of the recent transmissions. The more UEs/vehicles that are selected to provide feedback, the higher the signaling overhead in the UpLink (UL) is. A UE her may also be viewed as a vehicle. The extreme case is to let all UEs in the group provide feedback. In order to avoid unnecessary signaling overhead, it is enough to select UEs that are close to the group border to report. Those UEs have the worst connection quality, so if the group HARQ settings are tuned for these UEs, the rest of the UEs will for sure have successful reception. The UEs selected for reporting may change over time, e.g. due to user/vehicle mobility.

Figure 1:
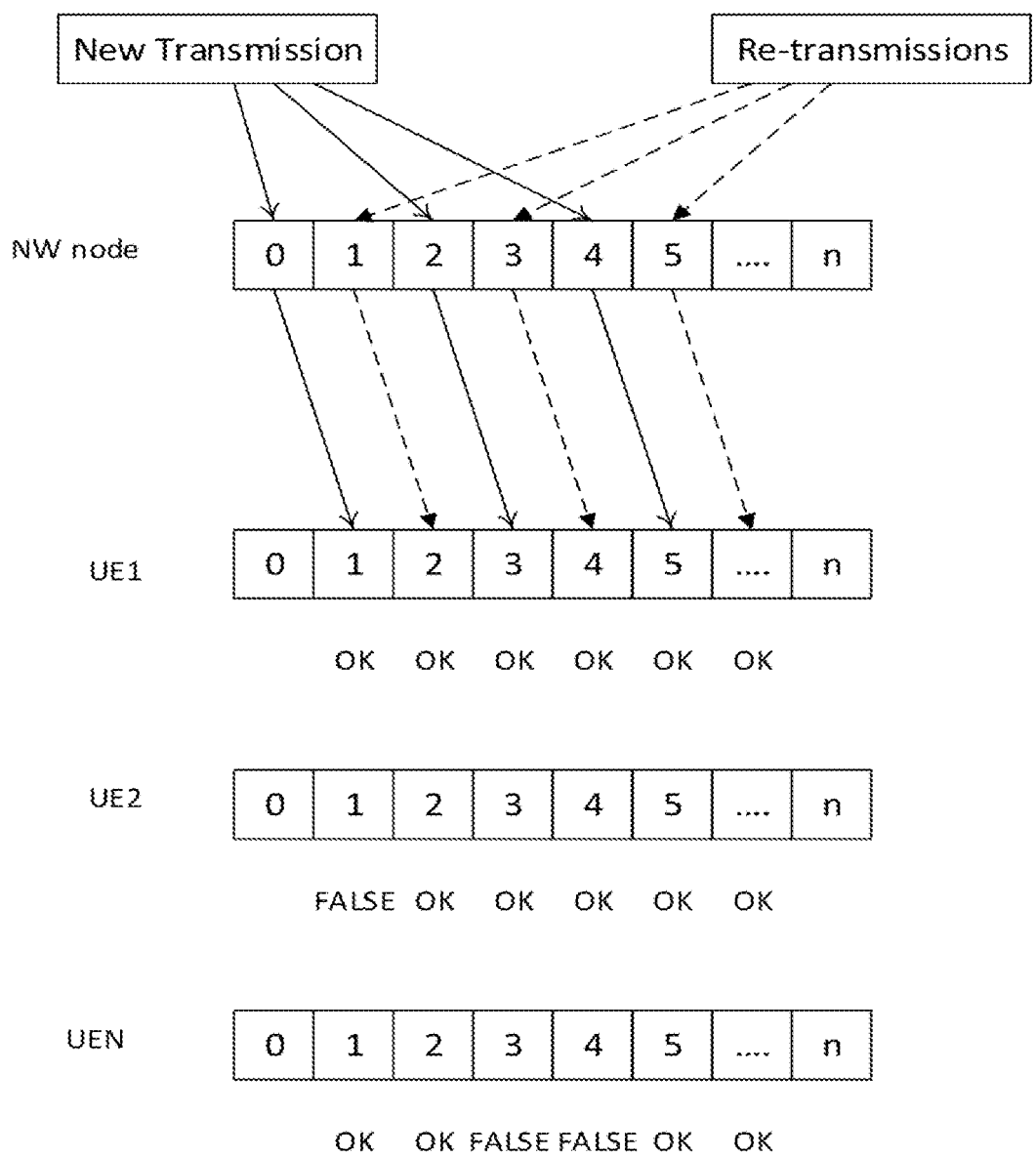
FIG. 1 is an example of autonomous HARQ transmissions.
Figure 2:
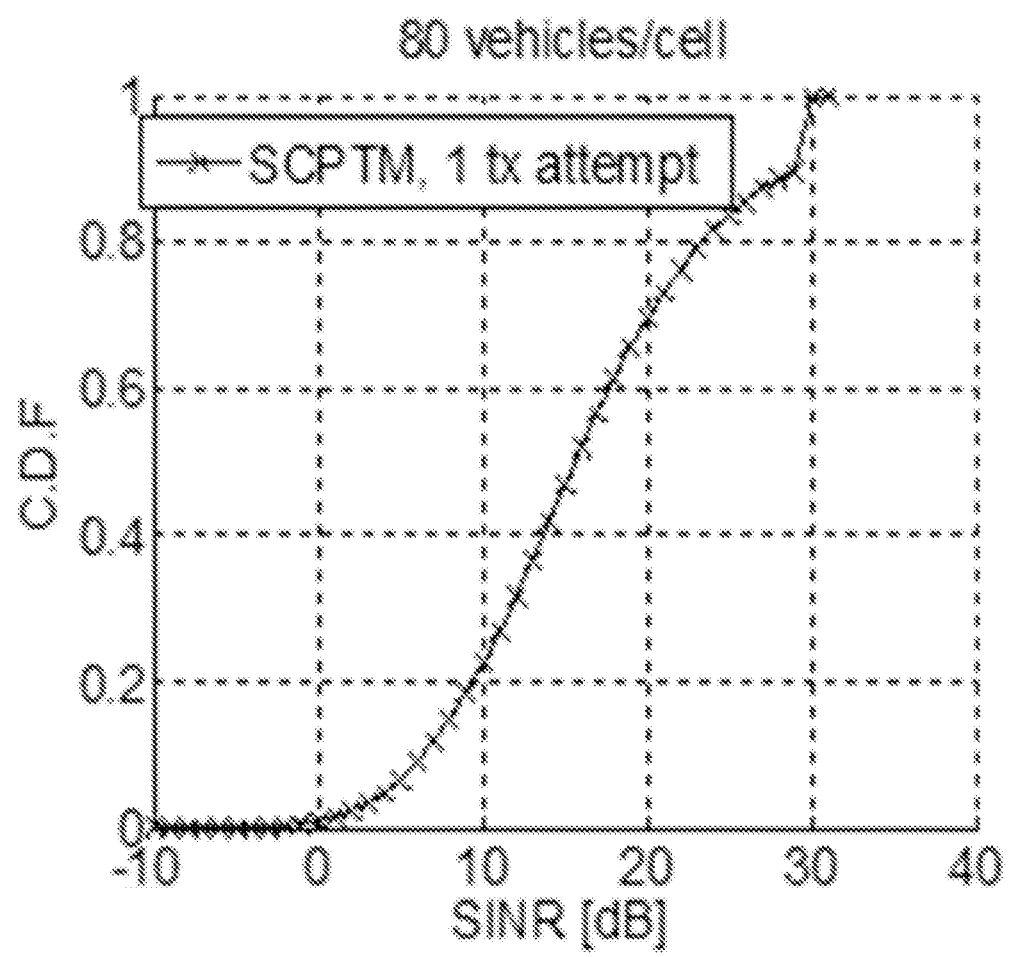
FIGS. 2-4 illustrates simulations result of V2X simulations using single cell point to multipoint (SCPTM) to transmit a cooperative CAM.
Figure 3:
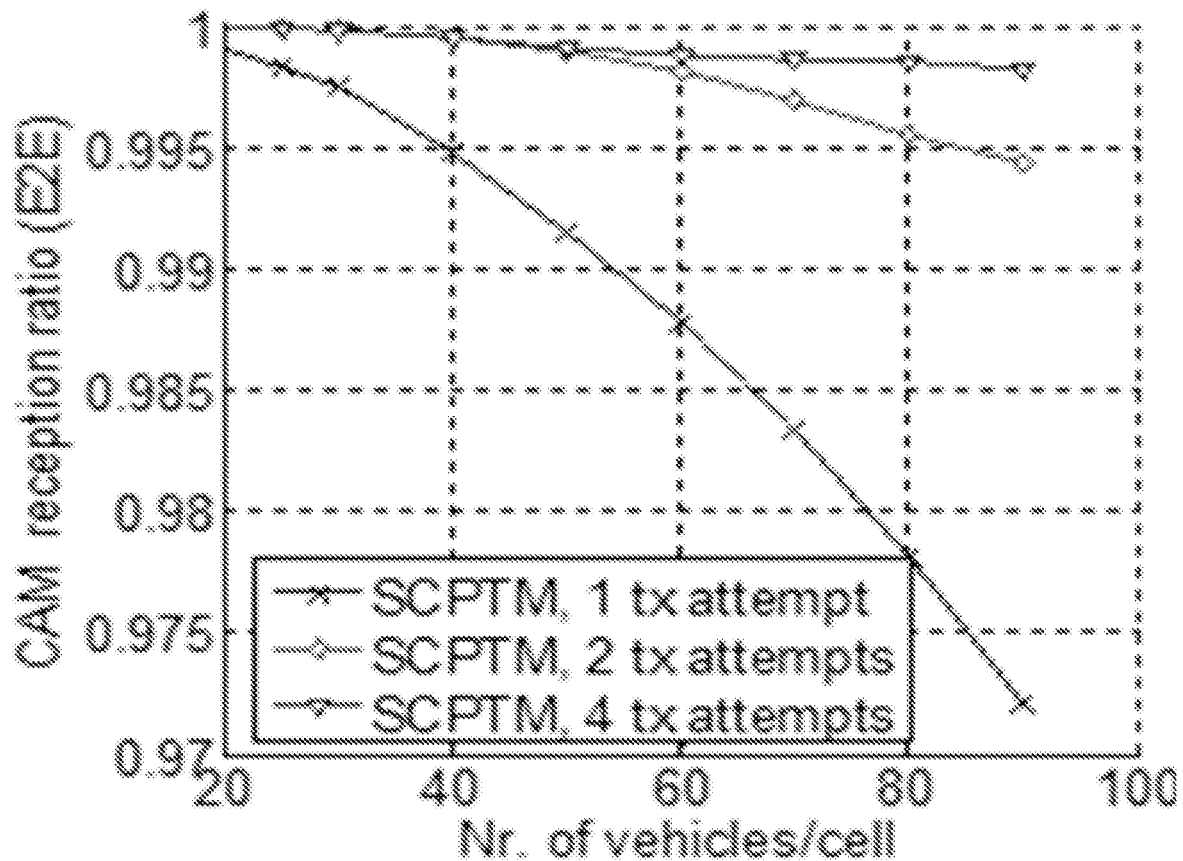
Figure 4:
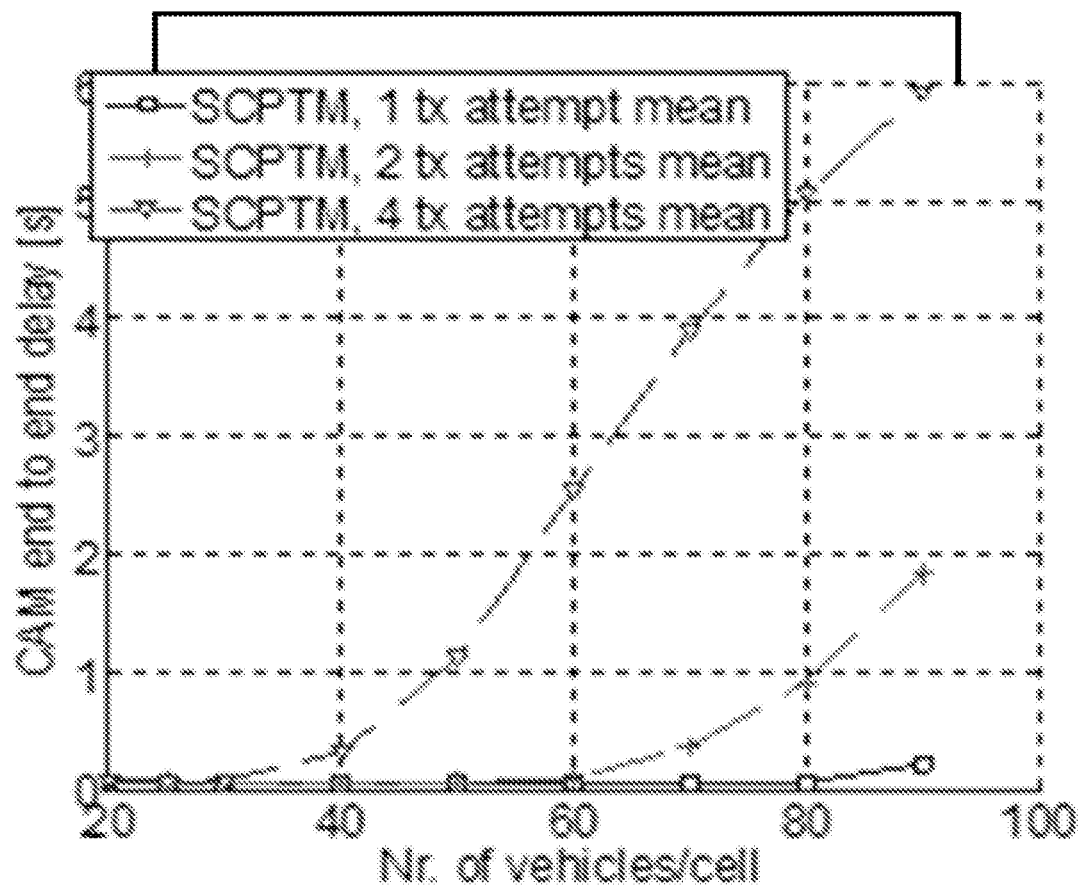
Figure 5:
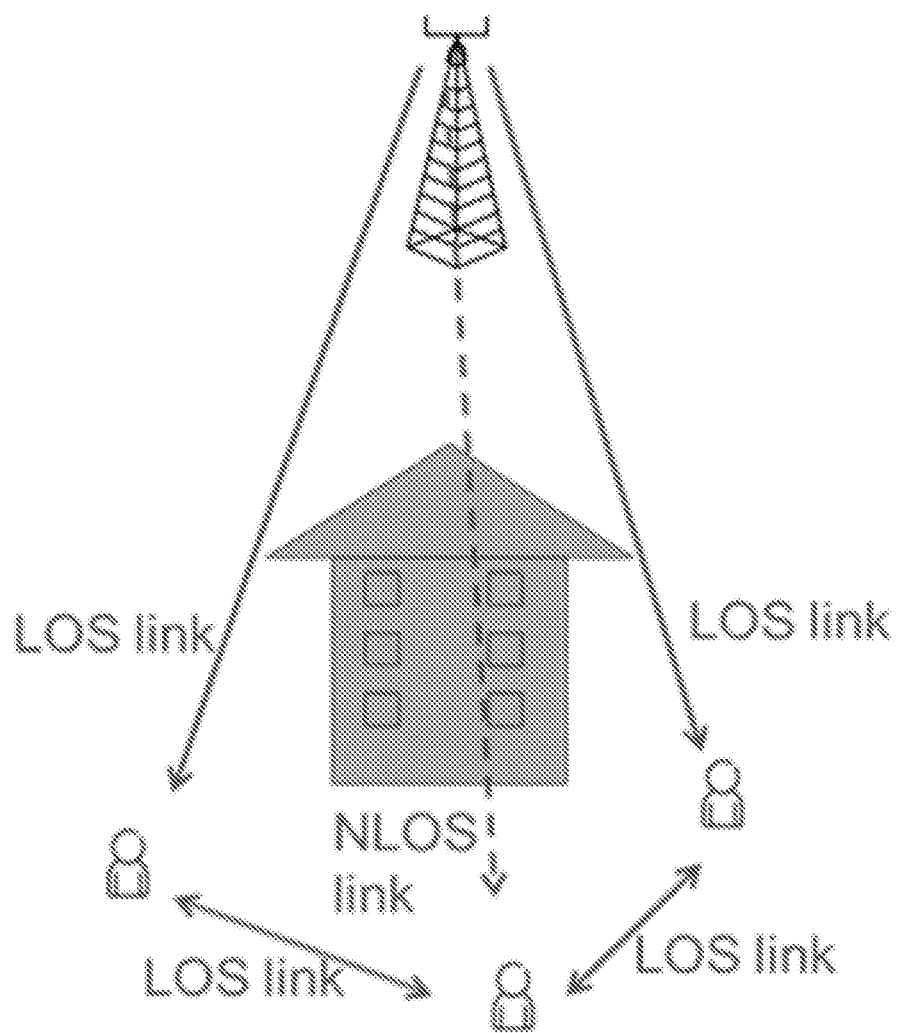
FIG. 5 illustrates a situation where 2 UEs have Line-Of-Site (LOS) links with a network node and one UE have Non-LOS link with the network node. All UEs have LOS links with each other.
Figure 6:
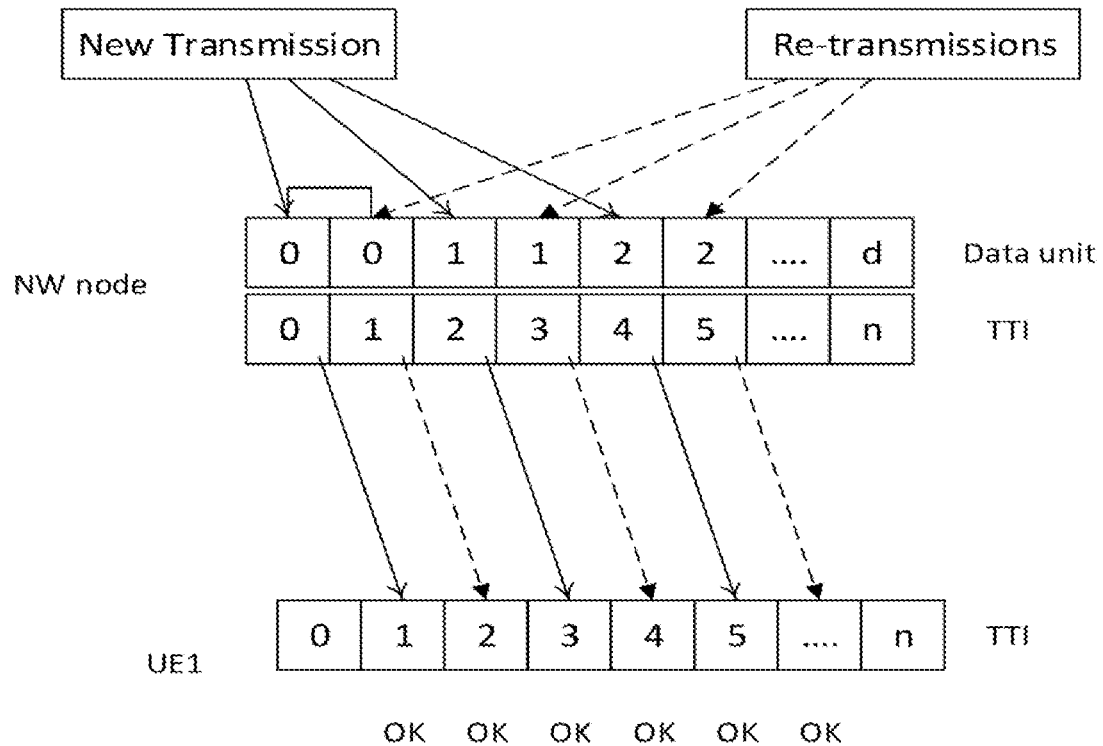
FIG. 6 illustrates autonomous retransmission of a data unit, normal case, 1 TTI.
Figure 7:
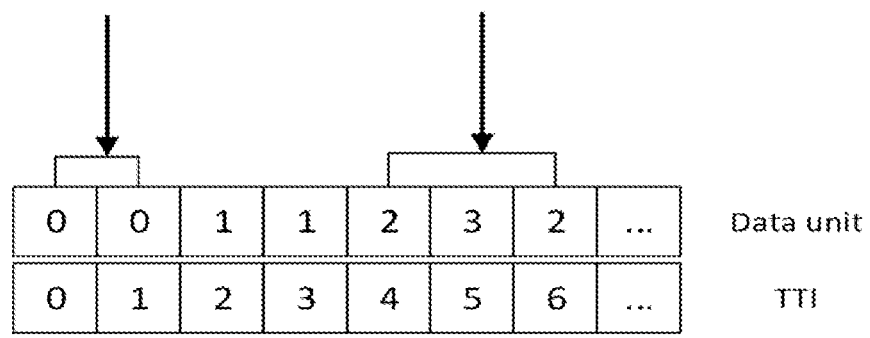
FIG. 7 depicts an example where the diversity distance is increased from 1 TTI to 2 TTIs using 2 transmissions.

The existing autonomous HARQ functionality is illustrated in FIG. 6, while the proposed HARQ scheme is illustrated in FIG. 7. In FIG. 7, the diversity is increased by increasing the "diversity distance" between the transmissions compared to FIG. 6 where the diversity distance is 1 TTI. For simplicity, only tuning of "diversity distance" is exemplified. The same mechanism is also applicable to the number of retransmission attempts. The example of tuning "diversity distance" is further explained in the flowchart depicted in FIG. 8 illustrating a flowchart of some embodiments from the network node perspective.

Figure 8:
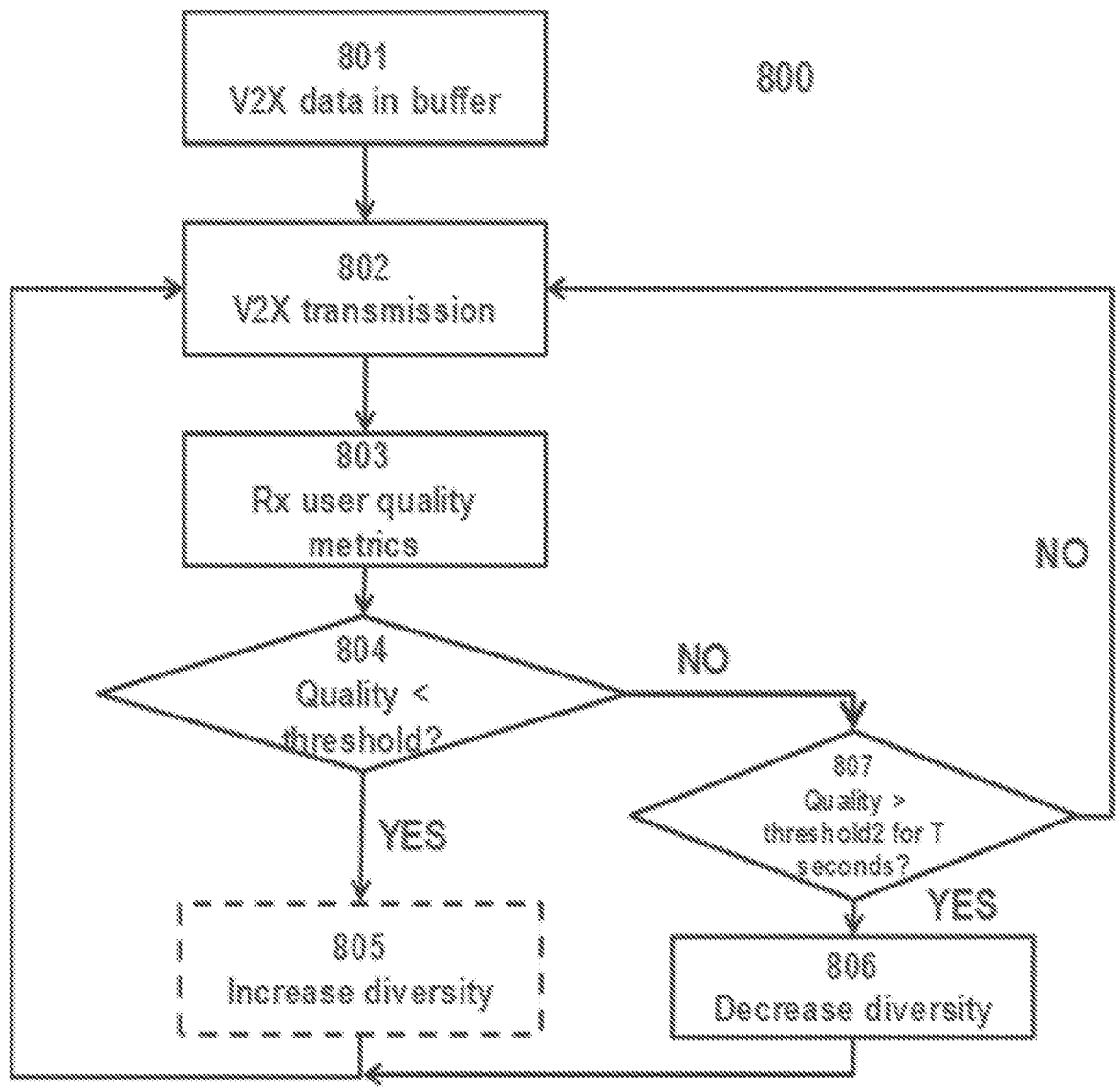
FIG. 8 illustrates a flowchart of some embodiments herein from the network node point of view.

FIG. 8 shows how the basic procedure 800 of some exemplary embodiments here seen from the NW node point of view. Data e.g. V2X data is present in the buffer 801 of the NW node. After a V2X data transmission (or broadcast) 802 the NW node is configured to collect/receive (Rx) any quality measurements or quality metrics from the UEs in the cell served by the NW node 803. If the quality is less than a first quality threshold 804 the diversity distance is increased 805 (see FIG. 9 for this continuation of 805). If the quality is good enough for some time i.e. it is over a second quality threshold 807 the diversity is decreased 806. Diversity may be increased for example by increasing the diversity distance or number of transmissions or changing PRB regions between original transmission and retransmission(s). Exactly how to increase (or decrease) the diversity is a tradeoff between desired success rate and maximum allowed transmission delay and may depend for example on the channel condition, UE/vehicle speeds, and the system or cell load (see FIG. 9).

Figure 9:
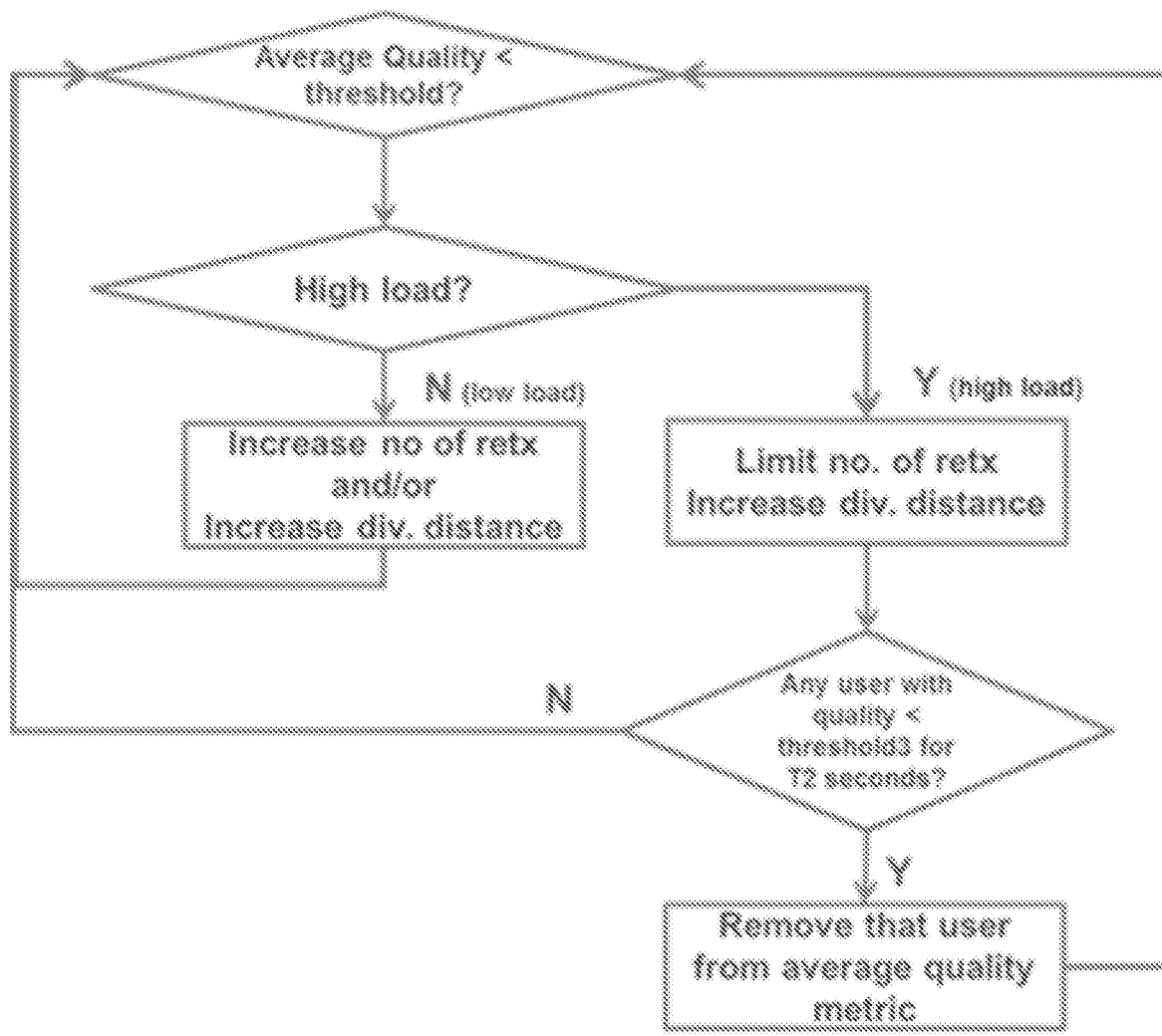
FIG. 9 illustrates a flowchart of some embodiments herein from the network node point of view related to FIG. 8.

Referring to FIG. 9 there is shown how to increase diversity (see FIG. 8 805) if the (average) quality is below the quality threshold. If the load of the cell served by the NW node (e.g. PRB utilization) is below (or medium) a threshold, the NW node is configured to increase the diversity (i.e. more retransmissions, increased diversity distance, change of PRB regions for retransmissions). If the load is high i.e. above a predetermined threshold an increase of retransmission may not help since it may just increase the data transmit buffer size (and the PRB utilization). Therefore, it is better to limit the number of retransmission (retx) and only increase the diversity distance. Also, UEs/vehicles with consistently bad reception quality are removed from the average quality metric. If the load is high for a very long time it may even be better to simply go back to no diversity at all, i.e. one single transmission (but for critical messages this is of course no an optimal solution).

Whenever the HARQ setting is updated, the NW node is configured to inform or notify all UEs in the group, so that each UE understands if the on-going HARQ transmission is a new transmission or retransmission attempt. The UEs also need to understand how many retransmission attempts are applied to the on-going transmission, and when the next retransmission is going to happen.

The NW node is further configured to signal/transmit to UEs that need to provide feedback. The new signaling may be added to a new Medium Access Control (MAC) control element, or carried by Downlink Control Channel, e.g., the Physical Downlink Control CHannel (PDCCH) by reusing the existing fields.

The embodiments described above hence relate a NW node that sends HARQ transmissions with autonomous retransmissions to a group of UEs and receive HARQ feedback from a subset of those UEs. Based on the feedback, the NW node is configured to control the success rate by altering either or both of the number of autonomous retransmissions or the diversity distance of the re-transmissions. In case of high load, the number of re-transmissions is lowered and the diversity distance may be increased. The UEs that are selected to provide feedback are cell-edge UEs. UEs with consistently bad reception quality may be removed from the group.

Figure 10:
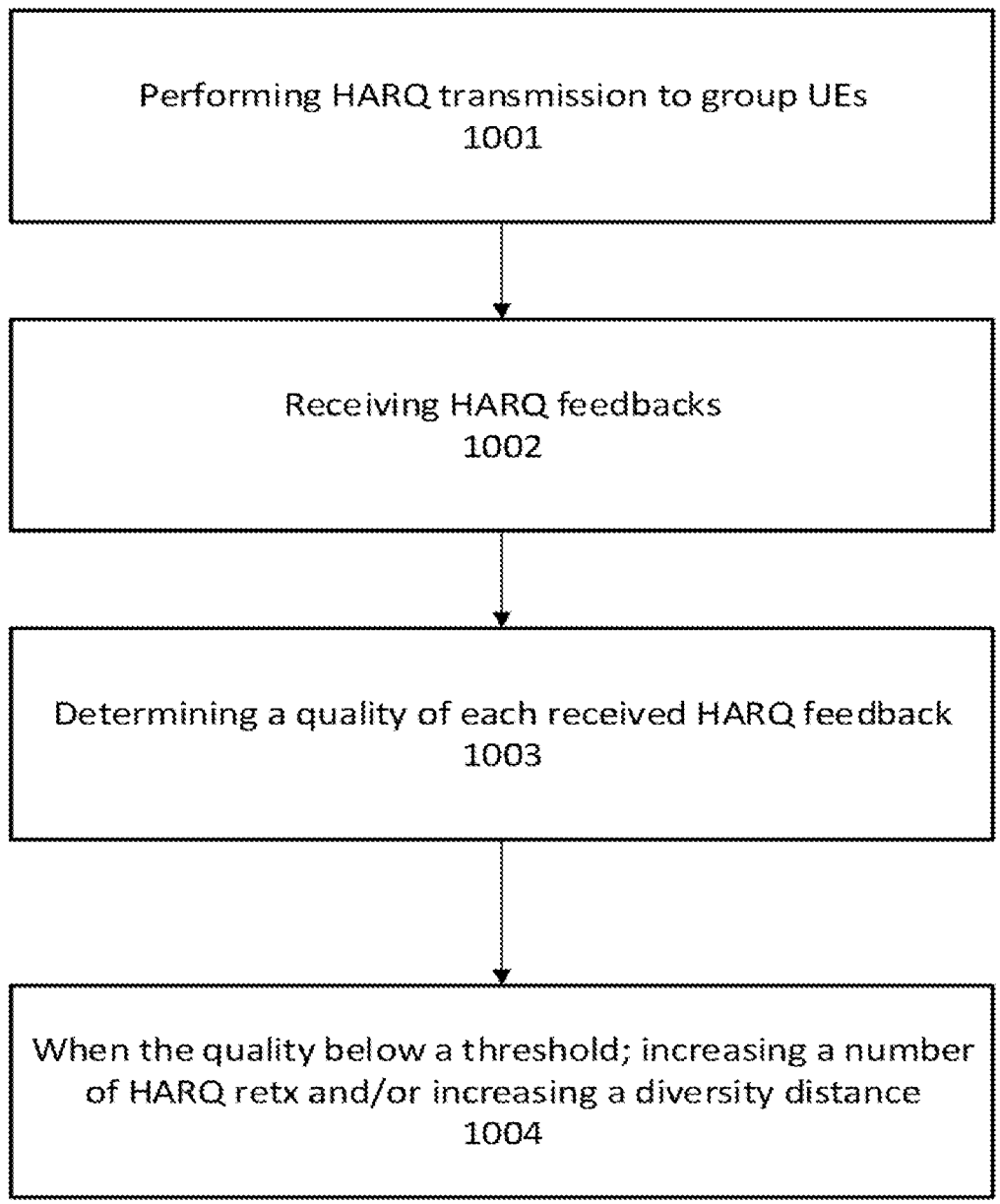
FIG. 10 is a flowchart depicting a method performed by a network node according to embodiments herein.

Referring to FIG. 10 there is provided the main steps of a method performed by a NW node in accordance with previously described embodiments.

The method comprising:

Performing (1001) HARQ, transmission (which maybe data transmission) to said UEs of the group;

Receiving (1002) HARQ feedback from at least one UE of the group, in response to the HARQ transmission;

Determining (1003) a quality of each received HARQ feedback; and when said determined quality is below a predefined first quality threshold; increasing a number of HARQ re-transmissions to said at least one UE and/or increasing a diversity distance i.e. increasing the number of Transmission Time Intervals, TTIs, between said HARQ transmission and a subsequent HARQ re-transmission.

According to an embodiment when the determined quality is above the predefined first quality threshold and the determined quality is above a predefined second quality threshold during a predetermined number of TTIs decreasing the diversity distance and/or a number of HARQ re-transmissions to said at least one UE.

According to another embodiment and as previously described the method further comprising determining a load of a cell served by the network node and when the load is above a predetermined load threshold, increasing the number of HARQ transmission to a limited predefined number of HARQ retransmissions and increasing said diversity distance. The method further comprising refraining from determining quality of HARQ feedbacks received from UEs of the group having a quality below a predefined third quality threshold during a predetermined number of TTIs and removing the UEs of the group having the quality below a predefined third quality threshold from an average quality metric.

The method further comprising transmitting to at least one UE of the group at least one signaling comprising HARQ, parameters including said diversity distance and information on a number of retransmissions which will be used by a UE as will be described.

Figure 11:
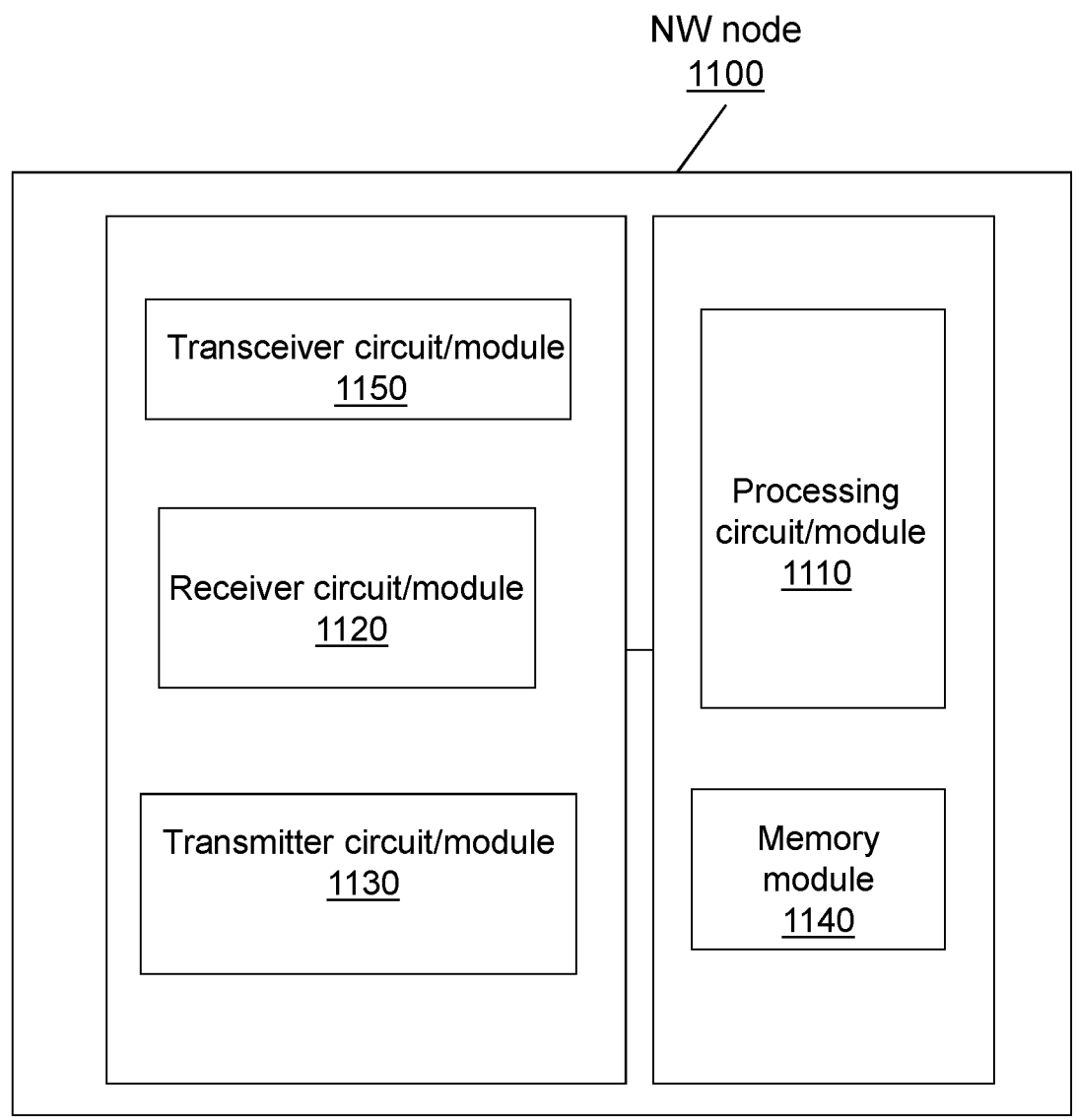
FIG. 11 is a schematic block diagram illustrating embodiments of a network node according to embodiments herein.

In order to perform the method or procedure steps/actions described above, the NW 1100 node comprises the following arrangement depicted in FIG. 11, and as described below. The NW node 1100 comprises a processing circuit or a processing module or a processor or means 1110, antenna circuitry (not shown); a receiver circuit or receiver module 1120; a transmitter circuit or transmitter circuit 1130; a memory module 1140 and a transceiver circuit or transceiver module 1150 which may include the transmitter circuit 1130 and the receiver circuit 1120. The NW node maybe a base station or a radio base station or a eNodeB.

The processing module/circuit 1110 includes a processor, microprocessor, an application specific integrated circuit (ASIC), field programmable gate array (FPGA), or the like, and may be referred to as the "processor 1110." The processor 1110 controls the operation of the NW node 1100 and its components. Memory (circuit or module) 1140 includes a random access memory (RAM), a read only memory (ROM), and/or another type of memory to store data and instructions that may be used by processor 1110. In general, it will be understood that the NW node 1100 in one or more embodiments includes fixed or programmed circuitry that is configured to carry out the operations in any of the embodiments disclosed herein.

In at least one such example, the NW node 1100 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the NW node operations disclosed herein. Further, it will be appreciated that the NW node 1100 may comprise additional components not shown in FIG. 11.

The processing circuitry/module 1110 is configured or operative to perform HARQ transmission to said UEs of the group; receive HARQ feedback from at least one UE of the group, in response to the HARQ transmission; determine a quality of each received HARQ feedback; and when said determined quality is below a predefined first quality threshold; increase a number of HARQ re-transmissions to said at least one UE and/or increase a diversity distance i.e. increasing the number of Transmission Time Intervals, TTIs, between said HARQ transmission and a subsequent HARQ re-transmission.

When the determined quality is above the predefined first quality threshold and the determined quality is above a predefined second quality threshold during a predetermined number of TTIs, the NW node 1100 is operative to decrease the diversity distance and/or decrease a number of HARQ re-transmissions to said at least one UE. The NW node 1100 is further operative to determine a load of a cell served by the network node and when the load is above a predetermined load threshold, increase the number of HARQ transmission to a limited predefined number of HARQ retransmissions and increase said diversity distance.

The NW node 1100 according is further operative to refrain from determining quality of HARQ feedbacks received from UEs of the group having a quality below a predefined third quality threshold during a predetermined number of TTIs and remove the UEs of the group having the quality below a predefined third quality threshold from an average quality metric.

The NW node 1100 is further operative to notify at least one UE of the group to provide HARQ feedback and to inform all UEs of the group if a subsequent HARQ transmission is a new transmission or if it is a HARQ retransmission; and to notify and/or/inform in a signal to the at least one UE using a Medium Access Control Control Element or a downlink control channel.

The NW node 1100 is further operative to transmit to at least one UE of the group at least one signaling comprising HARQ, parameters including said diversity distance and information on a number of retransmissions.

Additional operations performed by the first UE 900 have already been described.

Figure 12:
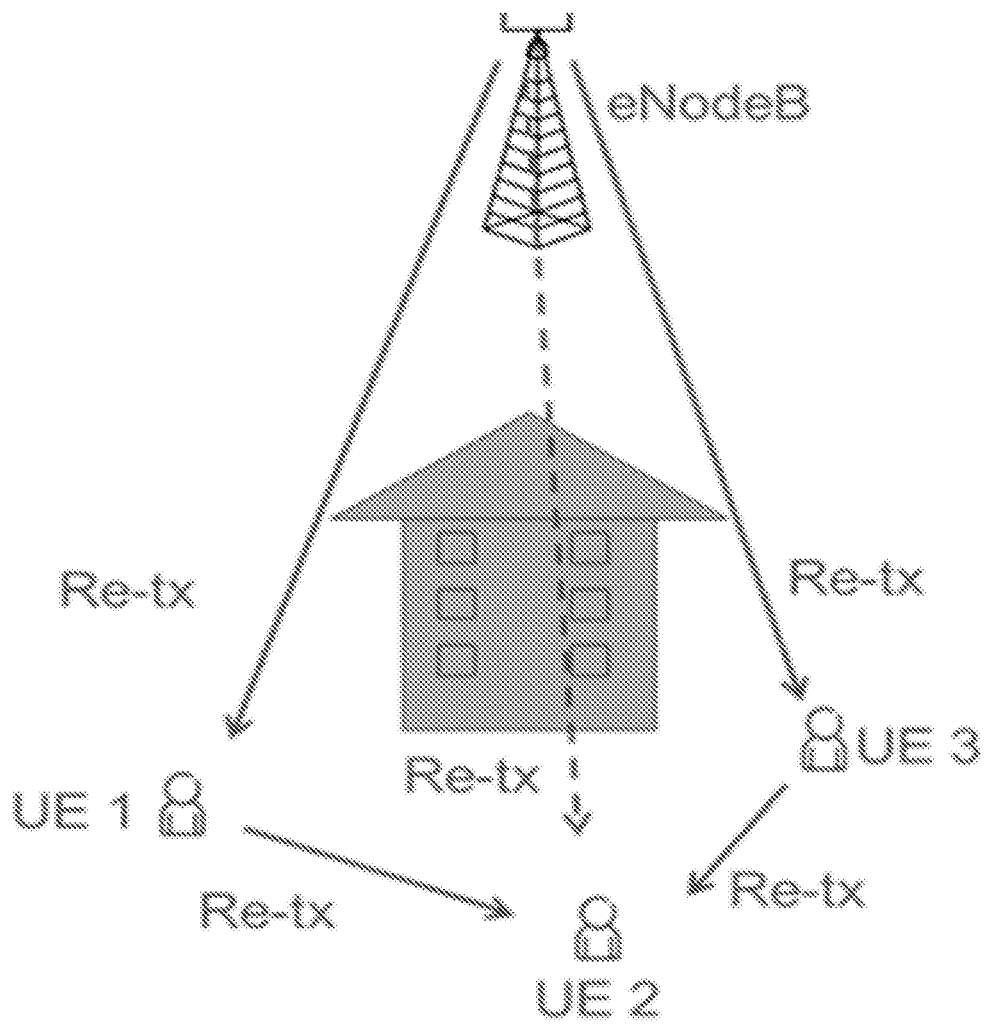
FIG. 12 depicts a scenario where UEs (UE1 and UE3) aid the network node to jointly (simultaneous transmission) transmit the retransmission to UE2 according to some embodiments herein.

As previously described, in an autonomous HARQ retransmission scheme to a group the NW node is configured to send a configurable number of re-transmissions at specified time instances to the group. The UEs that have received the original transmission correctly will know exactly what the retransmission will contain and when it will be sent from the NW node. This may be utilized in such a way that the UEs that received the original transmission correctly transmit the same retransmission (using the same DL resource blocks) as the NW node in synchronous manner (joint transmission). This is advantageous compared to using "ordinary" D2D since it uses the same LTE or NX stack and therefore has considerable less delays. This will increase the probability for the UEs that did not receive the original transmission correctly to receive the re-transmission correctly. FIG. 12 illustrates an exemplary scenario where the NW node and 2 UEs (U1 and UE3) jointly transmit the re-transmissions to a third UE (UE 2) which did not receive the original transmission correctly.

The diversity distance, i.e. the number of TTIs from the original transmission to the re-transmission need first be set to be high enough to allow needed UE processing of a correctly received transmission. This includes making the packet ready for transmission. The diversity distance and number of autonomous re-transmissions are set by the NW node (or eNodeB) and signaled to the UEs.

Figure 13:
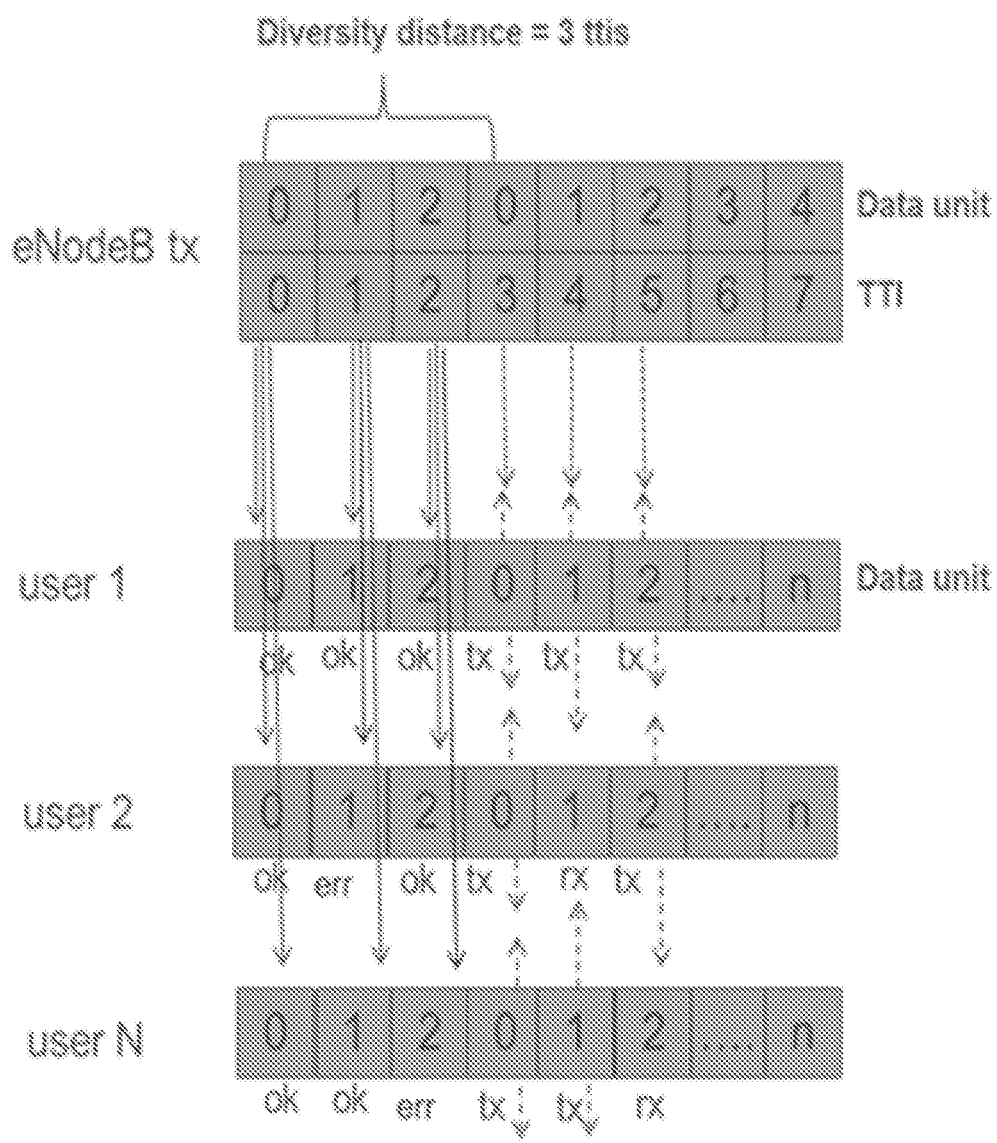
FIG. 13 depicts the case where UEs that received the original transmissions correctly transmit the retransmission jointly with the network node.

In FIG. 13, an exemplar embodiment herein is depicted using a diversity distance of 3 TTIs. Data unit 0 is, in this example, correctly received by all UEs, data unit 1 by user 1 and N, and data unit 2 is correctly received by UE 1 and UE 2. In TTI 3, the eNodeB and all UEs re-transmit data unit 0. In TTI 4, the eNodeB and UE 1 and UE N re-transmit data unit 1. In TTI 4, the eNodeB and UE 1 and UE 2 re-transmit data unit 2. This exemplary scheme makes it possible for UE 2, which did not receive data unit 1 correctly, to receive the re-transmission of this data unit from both the eNodeB and the other UEs which did receive the original transmission of data unit 1 correctly. This joint transmission of data unit 1 will hence increase the SINR which increases the probability of correct reception.

For this joint transmission to work, the same transport format, coding and resource block need to be used by the eNodeB and the re-transmitting UEs. This may be be configured by the NW node, e.g. use the same as was used in the original transmission. A receiver combining need also be taken into account. If e.g. Chase combining is used, the re-transmission is identical to the original transmission so there is no extra complexity. If e.g. Incremental Redundancy (IR) combining is used, the re-transmission is different from the original and this scheme hence need to be defined if IR is used.

For the timing, the UE is configured to transmit so that the UEs in its (close) neighborhood receive the eNodeB re-transmission and UE re-transmission (approximately) simultaneously. Since the UE is configured to transmit to reach UEs in a relatively close area it should only require a relatively small offset compared to when it receives the eNodeB transmission. Here it is assumed that all UEs are in both UL and DL synch with the eNodeB.

Figure 14:
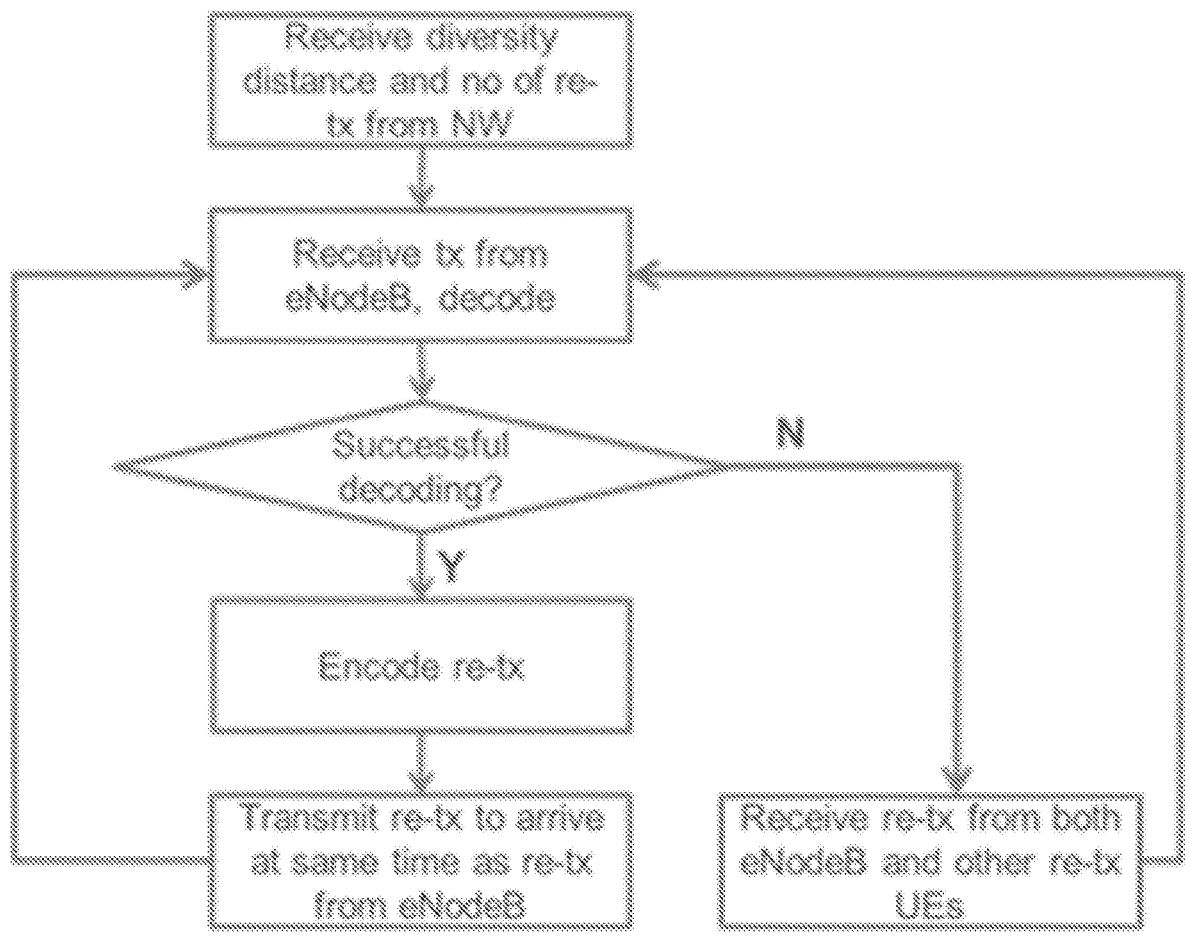
FIG. 14 illustrates an exemplary flowchart from a UEs (and one packet) perspective according to embodiments herein.

The algorithm as seen from a specific UE is depicted and exemplified in the flowchart in FIG. 8 in accordance with some exemplary embodiments herein. The UE is configured to initially receive a signalling comprising HARQ parameters (number of re-transmissions and diversity distance) from a NW node. Then, as the UE receives an original transmission from the eNodeB, it tries to decode the packet. If it is unsuccessful, it waits for the re-transmission. If the UE is successful when decoding the original transmission, it will encode the packet again and re-transmit jointly with the eNode. Note that the flowchart of FIG. 14 only illustrates one packet and one re-transmission. Hence, the UE is not restricted to receive several original transmissions of other packets as-well as re-transmissions of other packets before it re-transmits the packet in the flowchart.

Figure 15:
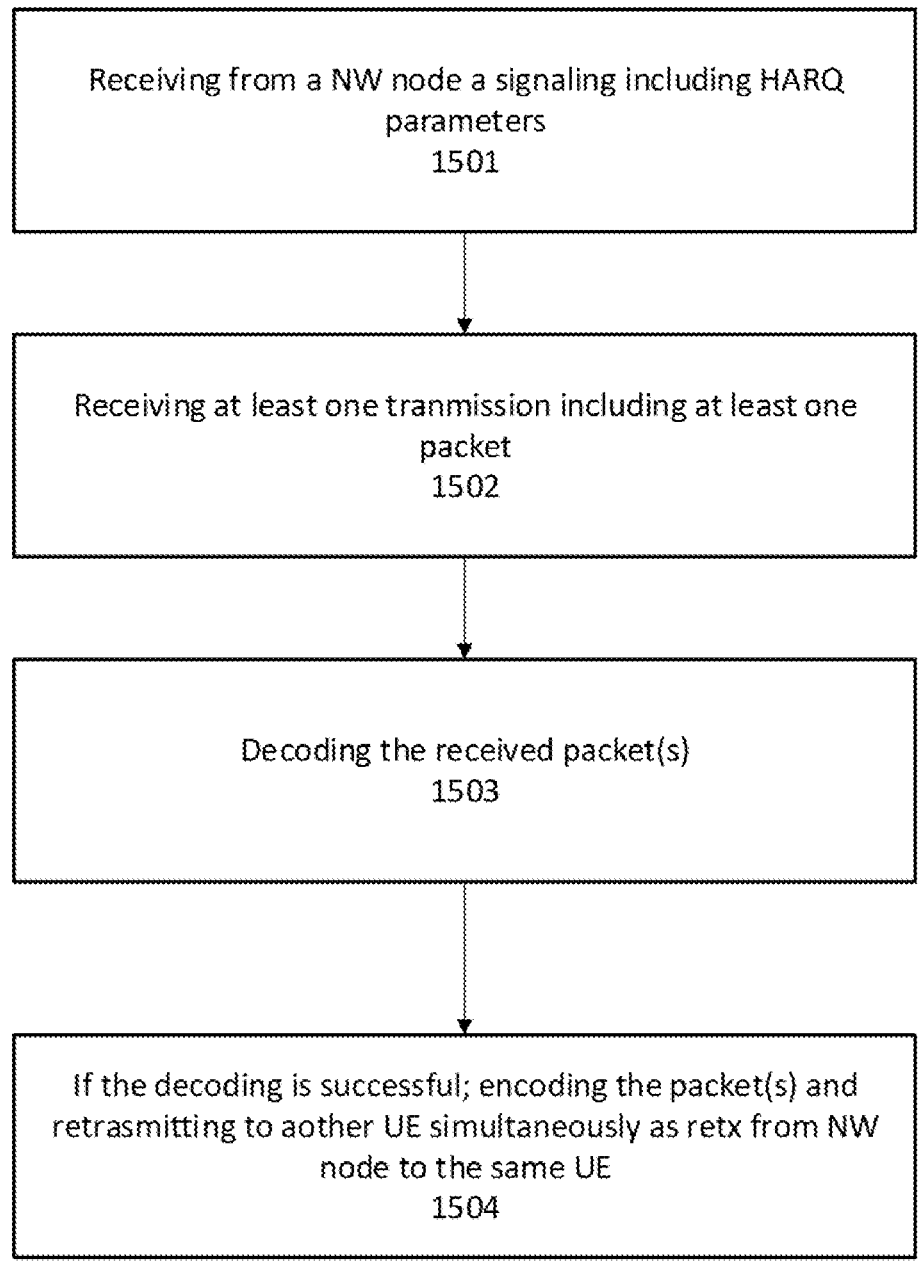
FIG. 15 is a flowchart depicting a method performed by a UE, according to embodiments herein.

Referring to FIG. 15 there is provided the main steps of a method performed by a UE node in accordance with previously described embodiments.

The method comprising:

Receiving (1501) from a NW node, at least one signaling comprising HARQ parameters including a diversity distance;

Receiving (1502) at least one transmission comprising at least one packet from the network node;

Decoding (1503) the received at least one packet;

if the decoding of the at least one packet is successful; encoding (1504) the at least one packet and retransmitting, to at least one other UE of the group, the at least one transmission including the at least one encoded packet, wherein retransmitting of the at least one packet is performed simultaneously as retransmission of the at least one transmission from the network node to the at least one other UE of the group.

According to an embodiment the method further comprises, if the decoding is unsuccessful, waiting for at least one next retransmission from the NW node and/or from at least one other UE of the group.

Figure 16:
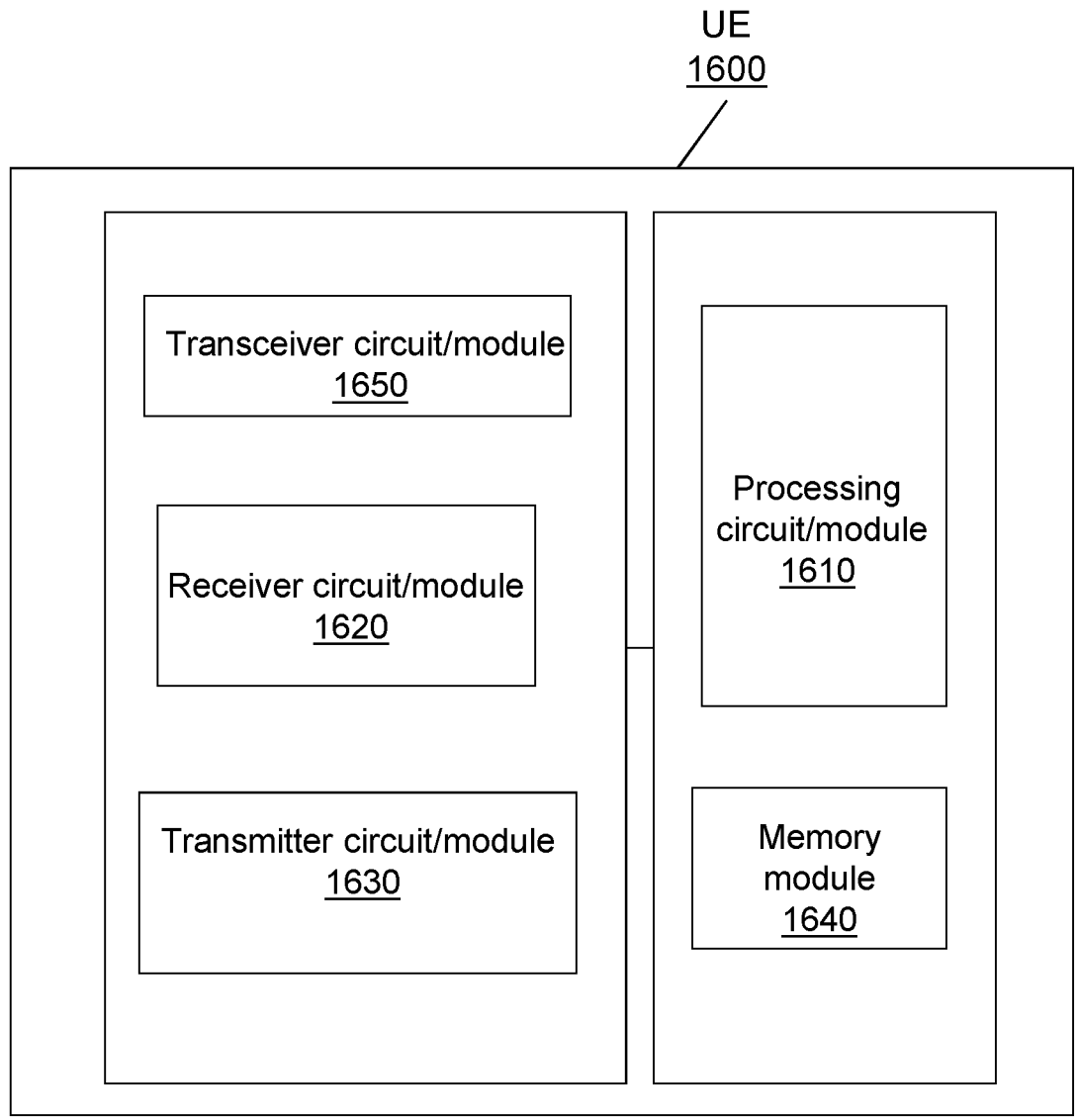
FIG. 16 is a schematic block diagram illustrating embodiments of as UE according to embodiments herein.

In order to perform the method or procedure steps/actions described above, the UE 16 comprises the following arrangement depicted in FIG. 16, and as described below.

The UE 1600 comprises a processing circuit or a processing module or a processor or means 1610, antenna circuitry (not shown); a receiver circuit or receiver module 1620; a transmitter circuit or transmitter circuit 1630; a memory module 1640 and a transceiver circuit or transceiver module 1650 which may include the transmitter circuit 1630 and the receiver circuit 1620. The UE may be a wireless device which is UE capable e.g. a mobile terminal, wireless terminal, mobile station, mobile telephone, cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples.

The processing module/circuit 1610 includes a processor, microprocessor, an application specific integrated circuit (ASIC), field programmable gate array (FPGA), or the like, and may be referred to as the "processor 1610." The processor 1610 controls the operation of the UE 1600 and its components. Memory (circuit or module) 1640 includes a random access memory (RAM), a read only memory (ROM), and/or another type of memory to store data and instructions that may be used by processor 1610. In general, it will be understood that the UE 1600 in one or more embodiments includes fixed or programmed circuitry that is configured to carry out the operations in any of the embodiments disclosed herein.

In at least one such example, the UE 1600 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the first UE operations disclosed herein. Further, it will be appreciated that the UE 1600 may comprise additional components not shown in FIG. 16.

The receiver module/circuit 1620 (also referred to as a receiver 1620 or receiver circuit 1620) or the transceiver module/circuit 1650 (also referred to as a transmitter 1650 or transmitter circuit 1650) is configured to receive from a NW node, at least one signaling comprising HARQ parameters including a diversity distance i.e. a number of Transmission Time Intervals, TTIs, between a HARQ transmission and a subsequent HARQ re-transmission and information on a number of retransmissions; receive at least one transmission comprising at least one packet from the network node; decode the received at least one packet; and if the decoding of the at least one packet is successful; encode the at least one packet and retransmit, to at least one other UE of the group, the at least one transmission including the at least one encoded packet, wherein retransmitting of the at least one packet is performed simultaneously as retransmission of the at least one transmission from the network node to the at least one other UE of the group, if the decoding of the at least one packet is unsuccessful, the UE 1600 is operative to wait for at least one next retransmission from the network node and/or from at least one UE of the group The memory module 1640 may contain instructions executable by the processor or processing circuitry or processing module 1610 whereby the UE 1600 is operative to perform the previously described method steps. There is also provided a computer program comprising computer readable code means which when run in the UE 1600 e.g. by means of the processor 1610 causes the UE 1600 to perform the above described method steps/actions described above.

Additional operations performed by the UE 1600 have already been described.

An advantage with embodiments herein to achieve reliable and efficient transmissions and to increase the SINR or SNR.

Another advantage is that two steps are provided to ensured high performance of the group transmissions.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), 5G, UMTS, WiMax, and WLAN employing D2D communications may also benefit from exploiting the ideas covered within this disclosure.

The invention claimed is:

1. A method performed by a network node for group transmission, the group comprising multiple User Equipment, UEs, the method comprising:
performing Hybrid Automatic Repeat ReQuest, HARQ, transmission to said UEs of the group;
receiving HARQ feedback from at least one UE of the group, in response to the HARQ transmission;
determining a quality of each received HARQ feedback; wherein the quality is determined based on at least one of channel condition, UE speeds, and cell load;
when said determined quality is below a predefined first quality threshold, increasing a number of HARQ re-transmissions to said UEs of the group that provide HARQ feedback to said network node or increasing a diversity distance, by increasing a number of Transmission Time Intervals, TTIs, between said HARQ transmission and a subsequent HARQ re-transmission; and
when said determined quality is above the predefined first quality threshold based on the at least one of channel condition, UE speeds, and cell load, and said determined quality is above a predefined second quality threshold during a predetermined number of TTIs, decreasing the diversity distance or a number of HARQ re-transmissions to said at least one UE of the group.

2. The method according to claim 1 further comprising refraining from determining quality of HARQ feedbacks received from UEs of the group having a quality below a predefined third quality threshold during a predetermined number of TTIs and removing the UEs of the group having the quality below a predefined third quality threshold from an average quality metric, wherein the quality is determined based on the at least one of channel condition, UE speeds, and cell load.

3. The method according to claim 1 further comprising determining a load of a cell served by the network node and, when the load is above a predetermined load threshold, increasing the number of HARQ transmission to a predefined number of HARQ retransmissions and increasing said diversity distance.

4. The method according to claim 1 further comprising notifying at least one UE of the group to provide HARQ feedback and informing all UEs of the group if a subsequent HARQ transmission is a new transmission or if it is a HARQ retransmission.

5. The method according to claim 4 wherein notifying or informing is signaled to the at least one UE in a Medium Access Control Control Element or in a downlink control channel.

6. The method according to claim 1 further comprising transmitting to at least one UE of the group at least one signaling comprising HARQ parameters including said diversity distance and information on a number of retransmissions.

7. A network node for group transmission, the group comprising multiple User Equipments, UEs, the network node comprising a processor and a memory, said memory containing instructions executable by the processor, whereby the network node is operative to:
- perform Hybrid Automatic Repeat ReQuest, HARQ, transmission to said UEs of the group;
- receive HARQ feedback from at least one UE of the group, in response to the HARQ transmission;
- determine a quality of each received HARQ feedback; wherein the quality is determined based on at least one of channel condition, UE speeds, and cell load;
- when said determined quality is below a predefined first quality threshold, increase a number of HARQ re-transmissions to said UEs of the group that provide HARQ feedback to said network node or increase a diversity distance, by increasing a number of Transmission Time Intervals, TTIs, between said HARQ transmission and a subsequent HARQ re-transmission; and
- when said determined quality is above the predefined first quality threshold based on the at least one of channel condition, UE speeds, and cell load, and said determined quality is above a predefined second quality threshold during a predetermined number of TTIs, the network node is operative to decrease the diversity distance or a number of HARQ re-transmissions to said at least one UE of the group.

8. The network node according to claim 7 is further operative to refrain from determining quality of HARQ feedbacks received from UEs of the group having a quality below a predefined third quality threshold during a predetermined number of TTIs and remove the UEs of the group having the quality below a predefined third quality threshold from an average quality metric, wherein, the quality is determined based on the at least one of channel condition, UE speeds, and cell load.

9. The network node according to claim 7 is further operative to determine a load of a cell served by the network node and, when the load is above a predetermined load threshold, increase the number of HARQ transmission to a predefined number of HARQ retransmissions and increase said diversity distance.

10. The network node according to claim 7 is further operative to notify at least one UE of the group to provide HARQ feedback and to inform all UEs of the group if a subsequent HARQ transmission is a new transmission or if it is a HARQ retransmission.

11. The network node according to claim 10 is operative to notify or inform in a signal to the at least one UE using a Medium Access Control Element or a downlink control channel.

12. The network node according to claim 7 is further operative to transmit to at least one UE of the group at least one signaling comprising HARQ parameters including said diversity distance and information on a number of retransmissions.

* * * * *